R. MORRILL.
PROCESS OF TREATING CYLINDERS.
APPLICATION FILED JAN. 31, 1908.
932,802.
Patented Aug. 31, 1909.
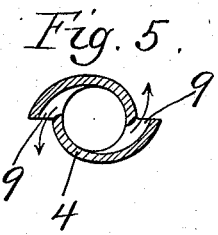
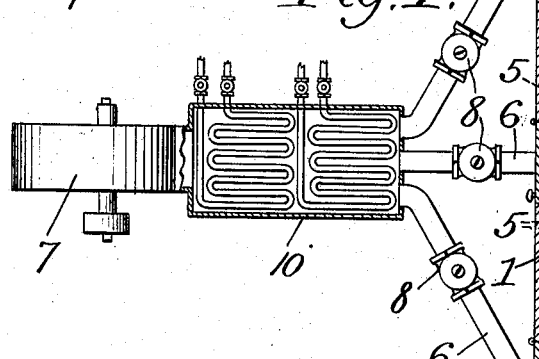
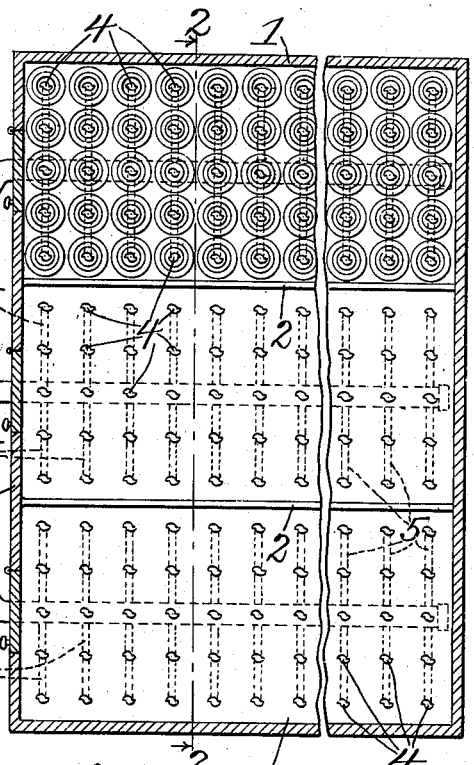
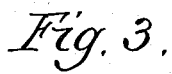
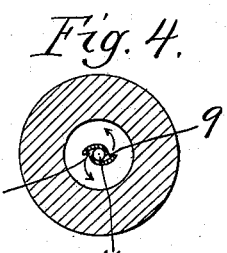
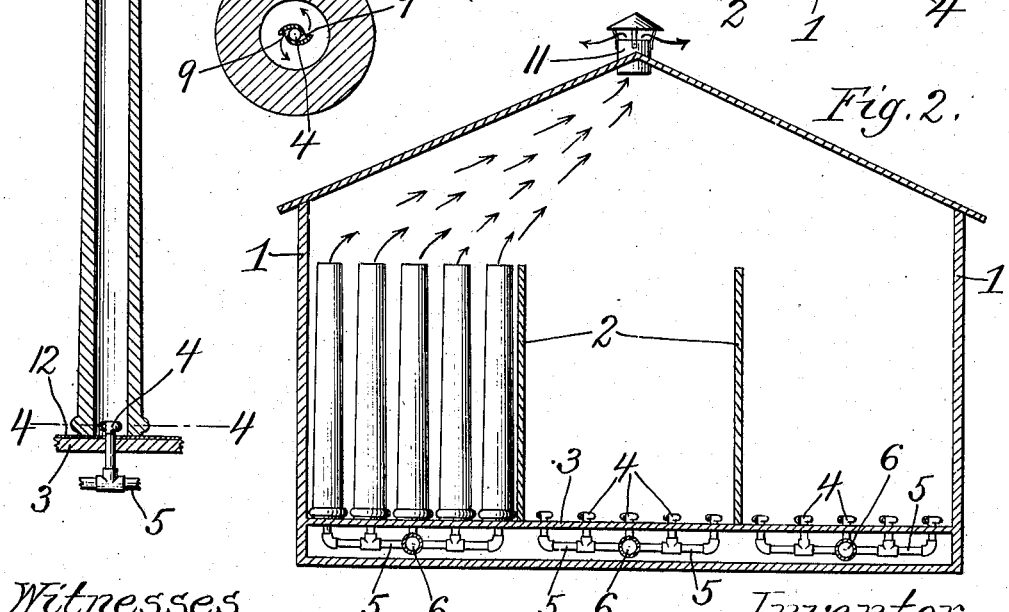
Witnesses.
Edward T. Wray.
Sophie B. Werner.
Inventor.
Roland Morrill.
by Parker ... 
Attorneys.

UNITED STATES PATENT OFFICE.

ROLAND MORRILL, OF BENTON HARBOR, MICHIGAN.

PROCESS OF TREATING CYLINDERS.

932,802.

Specification of Letters Patent.  Patented Aug. 31, 1909.

Application filed January 31, 1908. Serial No. 413,558.

*To all whom it may concern:*

Be it known that I, ROLAND MORRILL, a citizen of the United States, residing at Benton Harbor, in the county of Berrien and State of Michigan, have invented a certain new and useful Improvement in Processes of Treating Cylinders, of which the following is a specification.

This invention relates to a process and apparatus for treating cylinders, and has for its object to provide a new and improved process and apparatus of this description.

I have shown and described my invention with particular reference to the treatment of wooden cylinders but the process, in whole or in part, may be applied to the treatment of cylinders of other substance than wood, whether they are to be cured, dried or treated, and I wish the matters hereinafter set forth to be so understood, though I shall particularly describe the invention with reference to the treatment of wood.

Referring now to the drawings, Figure 1 illustrates one form of apparatus for carrying out the process; Fig. 2 is a sectional view taken on line 2—2 of Fig. 1; Fig. 3 is a vertical section through one of the columns illustrated in Figs. 1 and 2; Fig. 4 is a sectional view taken on line 4—4 of Fig. 3; Fig. 5 is an enlarged sectional view through one of the discharge devices.

In Figs. 1 and 2 there is illustrated a device for treating wooden cylinders for the purpose of seasoning them. In treating the cylinders they are hollowed out, that is, a portion of the center is removed so as to form an opening passing entirely therethrough. The cylinders may first be treated so as to remove more or less of the sap, etc., as by being steamed or otherwise treated for this purpose. The exterior is then preferably painted or coated with some material which prevents exterior drying. Then a current of air, preferably heated air, is passed through the hollowed out portion, that is, through the interior of the cylinder so as to act upon such interior and cause the drying or seasoning from within, that is, from the interior toward the exterior. Any suitable means for producing this result may be used. As herein illustrated, the cylinders of wood are placed in a suitable inclosing device 1 which is preferably divided into apartments by partitions 2, preferably extending only about the height of the cylinders. The cylinders are placed upon a suitable support 3 and a discharge device 4 preferably projects part way into each column. These discharge devices preferably project through or above the support 3 and are connected to pipes 5 which pipes are connected to a pipe 6 connected with a source of air supply which in this instance is shown as a blower 7. The partitions divide the inclosing device into apartments, and one or more pipes 6 pass into each of these apartments. Some means is provided for controlling the air as it passes into the cylinders. As herein shown the pipes 6 are provided with valves 8 by which the air passing therethrough may be controlled. Each discharge device 4 is preferably arranged with a plurality of discharge openings 9. These openings are arranged so as to let the air escape in a lateral direction, and are preferably arranged to produce a spiral or gyratory motion of the air. As illustrated in Fig. 5, the passageways leading to these discharge openings are somewhat curved and the planes of the openings are not at right angles to the diameter of the pipe through which the air is conveyed.

Some suitable means may be provided for heating the air. As herein shown the air from the air moving device 7 is heated by passing through an apartment 10 containing suitable heating devices such as heating coils. These heating coils may be arranged in sections, or there may be a plurality of such heating devices arranged so that any desired number may be rendered inoperative, thus permitting the control of the heat. The air may also be controlled by controlling the air moving device so as to increase or decrease the current of air produced thereby. When the air passes through the discharge openings 9 it will be given a spiral or gyratory motion, and will strike the inner face of the cylinder and pass therealong in this spiral movement toward the top of the cylinder. It will then pass out at the top and escape through the ventilators 11.

In order to secure a more perfect contact between the bottoms of the cylinders and the support, I may place a matting 12 of some suitable kind upon such support as shown in Fig. 3.

By providing a series of apartments as shown in Fig. 2 the cylinders may be removed from one apartment while they are being treated in the other. This construction also prevents the air on the outside and between the cylinders from being withdrawn during the process, thus reducing to a minimum the drying effect on the exterior of the cylinders. The air from the discharge device, it will be seen, is divided instead of being sent out in one stream.

It will be seen that I have here a process which consists in injecting a controllable, divided current of air into the interior of a hollow wooden cylinder. It will further be seen that this air may be given a spiral or gyratory movement so as to make it more effective. The current of air is controllable both as to temperature and pressure or speed, as well as direction. This produces, as it were, a multiplicity of currents in the hollow space or interior of the wooden cylinder.

By this process I can use small logs for making columns or other devices, and these small logs can be used each to form a single column or the like, and be seasoned without checking or other injury, which makes their use for this purpose under the present conditions impracticable.

It will be noted that the cylinders are, as it were, dried by mechanically applying a current of air to the interior thereof. It will be noted that this air takes up the moisture and that the air and moisture are removed through the central opening in the cylinder. By providing apartments as shown in Fig. 2, in addition to being able to fill one apartment while the cylinders in the other parts are being treated, this construction prevents the removal of the air surrounding the cylinders. I find that the best results are secured by providing some means to prevent the change of air at the exterior and to facilitate the rapid change of air in the interior of the cylinder so as to insure the seasoning from the interior toward the exterior.

In the specification and claims I have used the word "cylinder", but I use this word to include such structures as columns, or posts, or logs, or any other similar devices whether circular or non-circular.

The air is inserted in the cylinder in a lateral direction and thus strikes the bottom portion thereof insuring the proper seasoning at the bottom and the uniform seasoning of the entire cylinder.

By retarding the change of air at the exterior of the cylinders by placing the cylinders in compartments, as shown in Fig. 2, or by any other suitable means, the exterior is, as it were, kept moist and is surrounded by air which is more or less moist, this moisture on the exterior preventing checking of the wood and securing the seasoning of the columns without blemish.

There are numerous cylinders or cylindrical bodies which require treatment in the process of their manufacture, or treatment and drying as a result of their use, and my process is, even in more of its features, applicable where the moisture to be discharged does not to any considerable degree, if at all, permeate the substance of the cylinder to be treated.

I claim:

1. The process of treating cylinders which consists in injecting a gyratory current of air into the interior of said cylinder.

2. The process of treating cylinders which consists in coating the exterior of said cylinders with a coat of material for the purpose of retarding the drying of the exterior of the cylinder, then placing said cylinders in a dead-air compartment, then injecting a current of air in the interior of said cylinders and causing it to pass through the cylinders.

3. The process of treating cylinders which consists in coating the exterior of the cylinder with material which retards evaporation, then injecting a current of air into the interior of the cylinders for the purpose of drying the same and keeping the exterior thereof moist during the process of drying by surrounding the cylinder with dead air.

4. The process of treating cylinders which consists in rapidly changing the air in contact with the walls of the interior of the cylinder and retarding the change of air at the exterior of the cylinder.

5. The process of treating cylinders which consists in injecting a current of air laterally into the interior of such cylinder, at one end and directing such current toward the other.

6. The process of treating cylinders which consists in steaming such cylinder, applying a current of air to the interior of such cylinder so as to evaporate the moisture contained within the substance of such cylinder and retarding the change of air at the exterior of the cylinder.

7. The process of treating cylinders which consists in placing said cylinders in a dead air compartment and then injecting a current of air into the interior of such cylinders and causing it to pass through the cylinders.

8. The process of treating cylinders which consists in injecting a current of air into the interior of the cylinders for the purpose of drying the same, and keeping the exterior thereof moist during the process of drying by surrounding the cylinder with dead air.

9. The process of treating cylinders which consists in placing them in a dead air chamber, one end closed, the other open, and injecting into the closed end a current of dry air, and forcing such current out at the other end without disturbing such dead air.

10. The process of treating cylinders which consists in placing them in a dead air chamber, one end closed, the other open, and injecting into the closed end a current of dry air, and forcing such current out at the other end without disturbing such dead air, said current of air divided into separate inflowing parts.

11. The process of treating cylinders which consists in placing them in a dead air chamber, one end closed, the other open, and injecting into the closed end a current of dry air, and forcing such current out at the other end without disturbing such dead air, said current directed against the inside of the cylinder so as to pass spirally therethrough.

12. The process of treating cylinders which consists in placing them in a dead air chamber, one end closed, the other open, and injecting into the closed end a current of dry air, and forcing such current out at the other end without disturbing such dead air, and coating the exterior of said cylinder to retard evaporation.

ROLAND MORRILL.

Witnesses:
EDNA K. REYNOLDS,
SOPHIE B. WERNER.